(12) United States Patent
Jamzadeh (10) Patent No.: US 6,680,782 B1
(45) Date of Patent: Jan. 20, 2004

(54) METHOD AND APPARATUS OF USING A RASTER IMAGE PROCESSOR AND INTERPOLATOR TO INCREASE THE SPEED OF OPERATION AND REDUCE MEMORY REQUIREMENTS FOR ELECTRONIC PRINTING

(75) Inventor: Feraydoon Shahjahan Jamzadeh, Fairport, NY (US)

(73) Assignee: NexPress Solutions LLC, Rochester, NY (US)

( * ) Notice: Subject to any disclaimer, the term of this patent is extended or adjusted under 35 U.S.C. 154(b) by 1,826 days.

(21) Appl. No.: 08/085,605

(22) Filed: Jun. 30, 1993

(51) Int. Cl.[7] .............................................. G06K 15/00
(52) U.S. Cl. ..................................... 358/1.14; 358/1.17
(58) Field of Search .............................. 358/1.13, 1.15, 358/1.16, 1.17, 404, 444, 448, 449, 451

(56) References Cited

U.S. PATENT DOCUMENTS

| | | | |
|---|---|---|---|
| 3,573,789 A | 4/1971 | Sharp et al. ................. 340/324 |
| 4,124,870 A | 11/1978 | Schatz et al. ............... 358/260 |
| 4,193,092 A | 3/1980 | Stoffel ........................ 358/136 |
| 4,303,947 A | 12/1981 | Stoffel ........................ 358/260 |
| 4,384,336 A | 5/1983 | Frankle et al. ................ 382/49 |
| 4,549,222 A | 10/1985 | Fogaroli et al. ............. 358/296 |
| 4,595,958 A | 6/1986 | Anderson, Jr. et al. ..... 358/296 |
| 4,610,536 A | 9/1986 | Smyth et al. .................. 355/38 |
| 4,649,568 A | 3/1987 | Kiesel et al. .................. 382/41 |
| 4,661,987 A | 4/1987 | Anderson et al. ............. 382/41 |
| 4,722,064 A * | 1/1988 | Suzuki ........................ 395/115 |
| 4,881,180 A * | 11/1989 | Nishiyama ................... 395/115 |
| 5,047,955 A | 9/1991 | Shope et al. ................. 364/519 |
| 5,097,518 A | 3/1992 | Scott et al. .................... 382/47 |
| 5,113,455 A | 5/1992 | Scott ............................ 382/47 |
| 5,113,494 A | 5/1992 | Menendez et al. ........... 395/163 |
| 5,125,042 A | 6/1992 | Kerr et al. ..................... 382/47 |
| 5,125,072 A | 6/1992 | Ng .............................. 395/112 |
| 5,146,547 A * | 9/1992 | Beck et al. .................. 395/115 |
| 5,157,417 A | 10/1992 | Anzai .......................... 346/108 |
| 5,168,375 A * | 12/1992 | Reisch et al. ............... 358/432 |
| 5,347,368 A * | 9/1994 | Mochizuki .................. 358/404 |
| 5,351,074 A * | 9/1994 | Kadowaki et al. .......... 395/115 |
| 5,377,023 A * | 12/1994 | Sano et al. .................. 358/448 |

OTHER PUBLICATIONS

US 5,206,741, 4/1993, Shimura et al. (withdrawn)*

* cited by examiner

Primary Examiner—Arthur G. Evans (57) ABSTRACT

A method and apparatus for generating documents using a raster image processor operated in a low resolution mode to generate a low-resolution bit-mapped image from received print data containing a coded page description language. The low resolution page is then transmitted to a frame-store. The frame-store image is then interpolated by an interpolator from a low resolution image to a higher resolution image for use in a printer to produce a document at the higher resolution.

7 Claims, 10 Drawing Sheets

METHOD AND APPARATUS OF USING A RASTER IMAGE PROCESSOR AND INTERPOLATOR TO INCREASE THE SPEED OF OPERATION AND REDUCE MEMORY REQUIREMENTS FOR ELECTRONIC PRINTING

BACKGROUND OF THE INVENTION

1. Field of the Invention

This invention relates to an image processing system which is adapted to electronically edit images such as characters, graphic designs and images to produce and process an image record. In particular, the invention relates to a raster image processor (RIP) which translates the codes used by a page description language (PDL) into instructions to generate a bitmap page. Then it will execute these instructions to produce the bitmap page, that eventually is printed by the printer. The bitmap page contains pixel-by-pixel information of the page and, therefore, it could be very large if the page to be printed is large or if the printer resolution is high.

2. Description of the Prior Art

It is necessary to handle high-quality images in the printing field, and it is necessary to process a great amount of image data at a high speed in order to handle these high-quality images. It has been heretofore desirable to provide an image processing system in which characters, graphic designs and the like are consolidated as a whole for editing the same.

Particularly, among others, a desktop publishing art (DTP) has been gradually realized in a manner of description, but is still less capable and efficient when it comes to handling image art.

For printing and publishing applications, the communications between the printer and host computer and the outside world is usually through a page-description language, i.e., POSTSCRIPT® (registered trademark of Adobe Systems, Inc.). Files created with the PDL are sent to the host computer through a network connection or they could be generated by the host computer itself.

The print engines are typically raster-based devices that use a laser as an exposure source. Many patents describe the basics of laser printers, i.e., U.S. Pat. Nos. 4,994,827 and 5,047,791 and 5,151,717. All raster-based printers require a steady stream of raster data to be able to print. The PDL files are not in raster form and, therefore, the need for raster image processors (RIPs)to translate the codes used by page description language into instructions to generate a bitmap page. Then the RIP will execute these instructions to produce the bit-mapped page, that is eventually printed by the printer. It should be noted that the physical location of the RIP could be either in the host computer or inside the print engine itself, but wherever located, the function of the RIP is the same—to convert PDL codes to a raster format.

U.S. Pat. No. 5,125,072 discloses a memory system for a printer with multi-resolution, multi-bit input data. To reduce the total size of the memory subsystem, two separate frame-stores are used. One frame-store is used for text and graphics where the data is stored at one resolution and with 2 bits-per-pixel data depth. The other frame-store is used for images only where the data is stored at a different resolution than the first frame-store (usually lower resolution) and with 4 bits-per-pixel depth. Extra data processing hardware and band buffers are added to the system to change the data resolutions, combine the different segments of a page and locate the different segments in proper locations. The extra hardware must operate at the high printing speed of the exposure subsystem which increases their cost. Also, extra addressing and data buses are required to access each of the two frame-stores. The cost of this additional hardware will not be offset by the smaller "overall" memory sizes.

U.S. Pat. No. 5,125,072 is directed to changing the resolution of images scanned by the scanner to match the resolution of the RIP in order to combine the two data streams for printing. There is no mention of "generating" bit-mapped data by the RIP at low resolution.

The printer interface generally is responsible to time and position the image data pixel-by-pixel to the laser system. It will keep track of the number of pixels written and left in a line, the number of lines written and left in a separation, the separation color and the separations left to be written, and other printer-specific information. This section also contains a one-dimensional look-up table (LUT). One of its functions is to modify the tone reproduction of the printed image. If a photograph (in the image) is being printed, it is desirable to use a tone reproduction curve with a slope of 1 (more or less). Whereas, for printing text and graphics, it is generally preferred to have very sharp edges on the characters and lines. Therefore, a steep slope (high contrast) tone reproduction curve is used for texts and graphs.

The size of a single bitmap separation at 500 dpi is over 54 megabytes for a 12×18 inch page. For three colors, more than 162 megabytes of memory is needed for the bitmap separations to reside in storage. This much memory is only acceptable to high-end commercial image setters that typically cost hundreds of thousands of dollars. As indicated earlier, the bitmap image is always generated by the RIP and is then stored in the frame-store fully before it can be printed. Electrophotographic printers cannot be stopped once they begin printing a page; therefore, the full page must be rasterized and stored in a full-size frame-store in advance. Silver (AgX) based printers and image setters can stop in the middle of a page and, thus do not need full frame storage. The transfer of these huge images from the RIP to the frame-store is a very time-consuming task by itself. The SCSI channel is designed typically to handle 2–2.5 megabytes per second. That means 27 seconds for transfer of only one separation. This clearly reduces the throughput of the printer which is capable of 3.3 full color pages per minute. This throughput was used in the preferred embodiment, but could be varied using different printer configurations.

Another problem with storing the bitmap pages at full resolution of 500 dpi is that at the time of printing, data will be moving out of the frame-store at its full bandwidth rate. This translates into exclusive use of a frame-store for printing only. No images could be sent to it for storage when printing is taking place. In other words, we could not interleave image storage and image printing the way it is done for lower resolution images in the frame-store. Again, this further reduces the system throughput.

Clearly it can be seen that doubling the resolution means quadrupling the processing that the RIP must do. Presently, powerful RIPs take up to several minutes on pages with some graphics and text. The resolution of these printers is only 300 dpi. The RIP operating time will only increase if color is required. One can imagine how much time these RIPs would need to rasterize complex graphics and text pages at 500 dpi.

SUMMARY OF THE INVENTION

In accordance with the present invention, a RIP is operated in the low resolution mode thereby generating a low-resolution bit-mapped page. This low resolution page can then be transmitted quickly to the frame-store. The frame-store image is interpolated by an interpolator from a low resolution image to a higher resolution image or full resolution page for the printer which will print it in real time. Accordingly, the rasterization time is reduced considerably and so is the page transmission time. The need for a large page buffer is eliminated because the page is interpolated or expanded in real time.

The present invention provides a document generation method providing an output print data having the resolution of the print engine. The method comprises the steps of recovering print data containing coded instructions of a page description language and interpreting the coded instructions and producing a bit-mapped image representative of the received print data at a first resolution; storing the produced bit-mapped image and then interpolating the produced bit-mapped image to a second resolution and printing the interpolated bit-mapped image.

The invention further provides an apparatus for generating documents and providing output print data having the resolution of the print engine. The apparatus comprises means for receiving print data containing coded instructions of a page description language. Raster image processing means is used for interpreting said coded instructions and producing a bit-mapped image representative of the transmitted image at a first resolution and means for storing the bit-mapped image and means for interpolating the bit-mapped print data to a second resolution. There is also means for printing the interpolated print data at the second resolution.

BRIEF DESCRIPTION OF THE DRAWINGS

The teachings of the present invention may be clearly understood by considering the following detailed description in conjunction with the accompanying drawings in which.

DETAILED DESCRIPTION

Figure 1:
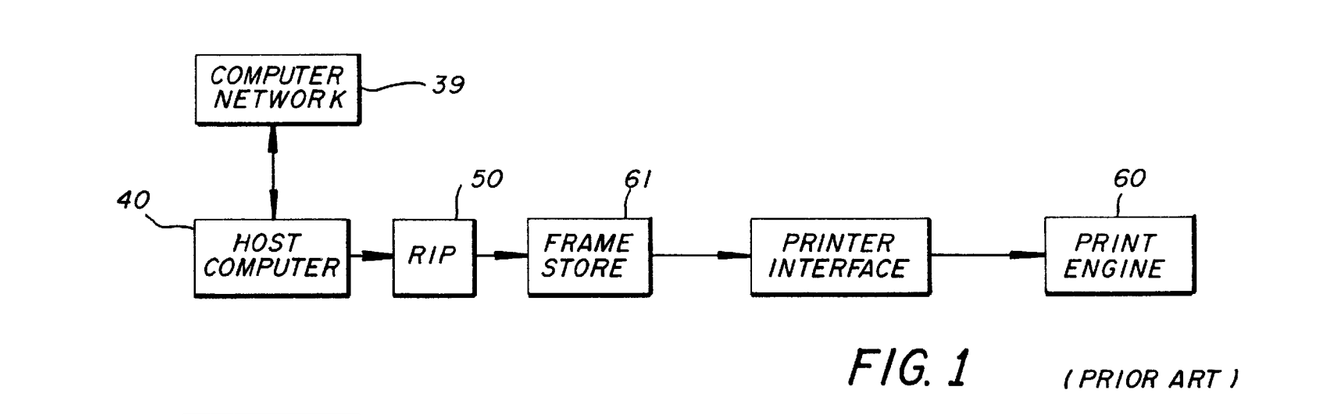
FIG. 1 shows a block diagram of the typical printer host configuration.

FIG. 1 illustrates a typical printer/computer configuration that is used today for printing and publishing applications. The communications between the printer and host computer and the outside world is through a page description language, i.e., POSTSCRIPT® (registered trademark of Adobe Systems, Inc.). Files created with the page description language (PDL) are sent to the host computer 40 through a computer network 39 connection alternatively they could have been generated by the host computer 40 itself. The physical location of the raster image processor (hereinafter referred to as RIP) 50 could be either in the host computer 40 or inside the print engine 60. But in either case, the function of the RIP 50 is the same and that is to convert PDL codes to a raster format for printing. All the common printers use the concept of storing the bit-mapped images in the resolution of the printer.

Figure 2:
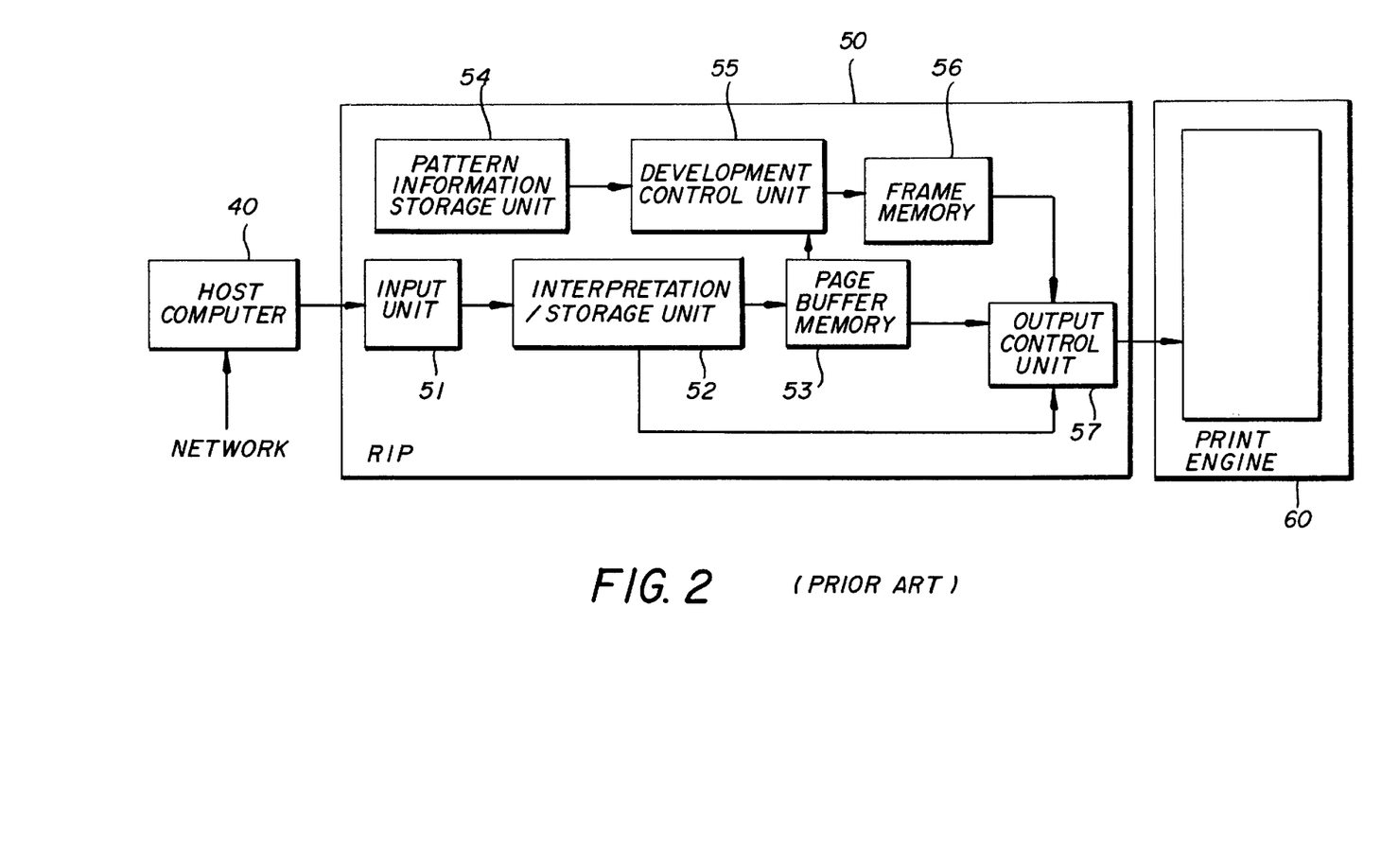
FIG. 2 is a block diagram of a raster image processor commonly known in the prior art.

In the apparatus shown in FIG. 2, a host computer 40 sends print data, etc., to RIP 50, which performs the data processing on the print data sent from the host computer 40 and outputs the processed data to a print engine 60. The function of print engine 60 is to print out the print data received from the RIP 50 with a designated format and resolution.

The RIP 50, shown in greater detail in FIG. 2, is a configuration well known in the art and includes an input unit 51 for receiving the data from the host computer 40. The interpretation unit 52 separates control commands from print data by analyzing the data sent from the host computer 40 through input unit 51. The page buffer memory 53 stores the print data. RIP 50 also includes a pattern information storage unit 54 for corresponding print data. The development control unit 55 performs pattern development by scaling the patterns and modifying the scaling rules according to the scaling factor. The processed pattern data is ready for printing and is stored in frame memory 56. RIP 50 further includes an output control unit 57 for outputting image pattern data from the page buffer memory 57 or image data from memory 53 to print engine 60.

In the known printing apparatus, data sent from the host computer 40 is received by input unit 51, and interpretation/storage unit 52 analyzes whether the received data belongs to the category of control commands, or print data. The print data is processed in a known fashion and the processed print data is stored in page buffer memory 53. The development control unit 55 reads out the print data stored in page buffer memory 53 reads corresponding printing pattern from pattern information storage unit 54 and producing the print pattern into frame memory 56.

Meanwhile, the page buffer memory 53 stores both the image data for one page and control information relating to the printing circumstances. The output control unit 57 passes the pattern data stored in frame memory 56 to print engine 60 in accordance with the control information, and controls print engine 60 to print the image data out on a recording sheet.

The above explanation described the fundamentals of a simple RIP while U.S. Pat. No. 5,113,494 discloses the details of a high speed/high performance RIP which still incorporates the basic fundamentals such that either type of RIP could be used to practice the present invention.

In the known printing apparatus, printing resolution of the printer in print engine 60 based on the control by output control unit 57 is fixed, generally at several hundred dpi (dots per inch).

A known PDL (page description language) for a known DTP (desktop publishing) system can execute a complex print processor with a high quality and, in fact, can be made to produce a combined image of text information and graphic images on the same page.

Figure 3:
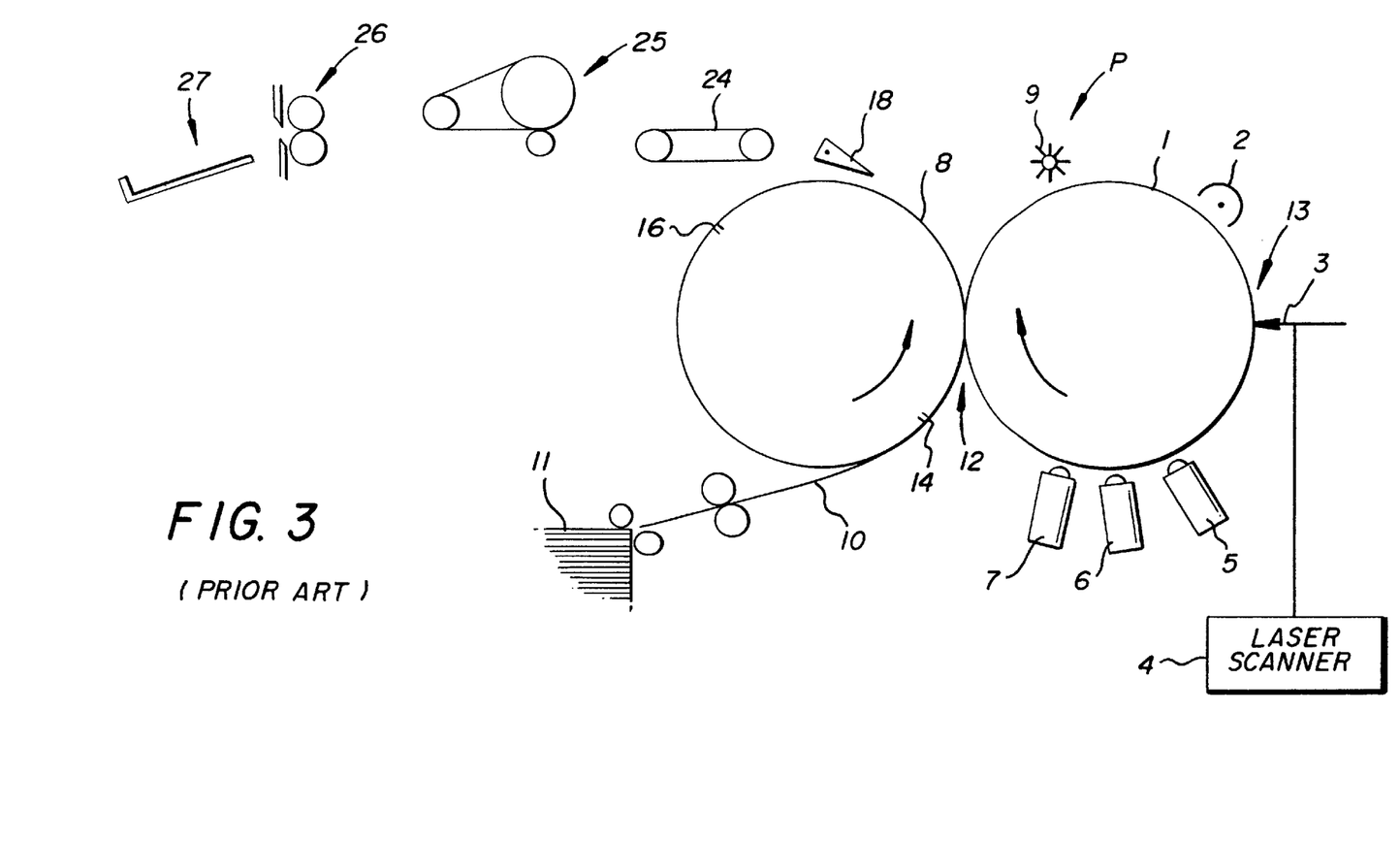
FIG. 3 is a schematic diagram of a typical laser print engine for producing a three-color electrophotographic image.

FIG. 3 shows schematically the internal functional parts of a typical laser print engine. In this instance, there is illustrated a three-color electrophotographic machine. The subject of the present invention may be applied to any raster based print engine, color or black and white, electrophotographic or otherwise.

Referring to the accompanying drawings, FIG. 3 generally schematically illustrates an electrophotographic color printer capable of producing a plurality of multicolor image frames on a single print receiver sheet. The electrophotographic color printer, designated generally by the letter P, is basically of the type set forth in the aforementioned U.S. Pat. No. 5,040,026, and is described below in sufficient detail for a complete understanding of this invention. Of course, the color printer could alternatively be, for example, a color inkjet printer, a color thermal printer, or any other suitable electronic color or black and white printer.

The electrophotographic color printer P comprises a reusable image recording element, for example, a photoconductive recording member in the form of a drum 1. The drum 1 is rotated by a motor, not shown, in a clockwise direction (as viewed in FIG. 3) past a series of processing stations, all of which are well known in the art. These stations include a charging station 2 which operates to uniformly charge the photoconductive surface of the drum 1, at an exposure station 13. Exposure station 13 imagewise exposes the uniformly charged surface to create developable latent electrostatic images thereon. The exposure station may comprise a conventional LED printhead, an ion-depositing head, or as schematically shown, a laser scanner 4.

As drum 1 rotates, the intensity of the output beam of laser scanner 4 is modulated with color-separated image information data, whereby a series of latent electrostatic images are produced on the drum surface, each representing a color-separated image of the ultimately desired multicolor print. The series of electrostatic images on drum 1 is rendered visible with different color marking particles (e.g., cyan, magenta and yellow toner), by development stations 5, 6 and 7, respectively, to produce a series of related toner images. These color-separated toner images are then transferred in registration to the print receiver sheet 10 carried on the periphery of a transfer drum 8. The photoconductive drum 1 is subsequently cleaned at a cleaning station 9 and recycled through the electrophotographic image-forming process.

Print receiver sheets 10 are fed, seriatim, from a sheet supply 11 to an image-transfer station 12 defined by the nip between drum 1 and transfer drum 8. As each sheet approaches the image-transfer station 12, it is secured to the transfer drum 8 by vacuum means, gripping fingers or other suitable mechanism. For example, the leading edge of the sheet can be secured to the transfer drum by vacuum through a row of vacuum ports 14 and the trailing end by vacuum through a row of vacuum ports 16. During each rotation of the transfer drum, one color-separated toner image is transferred to a receiver sheet, for example, by heating the receiver sheet to a degree sufficient to soften the toner and tack the toner to the receiver sheet (see, for example, U.S. Pat. No. 4,968,578, issued Nov. 6, 1990, in the name of Light; U.S. Pat. No. 4,927,727, issued May 22, 1990 in the name of Rimai et al; and U.S. Pat. No. 5,021,835, issued Jun. 4, 1991 in the names of Johnson et al).

After the transfer drum 8 has made three (four) revolutions and three related color-separated toner images (plus a black image if a fourth revolution is employed) have been transferred, and superimposed registration, to the surface of a print receiver sheet 10, the leading edge of the receiver sheet is stripped from the transfer drum 8 by stripping mechanism 18. The print receiver sheet 10 is transported by further rotation of the transfer drum 8 onto a sheet transport 24 which carries it to a fusing device 25 where the transferred images are fixed to the sheet by heat and/or pressure, for example. The print receiver sheet 10 is then cut by any suitable cutting mechanism 26 to provide a plurality of smaller prints each containing the reproduction from a single multicolor image frame. The resultant prints are collected in a tray 27 or more sophisticated print collecting device of any well known type.

Figure 4:
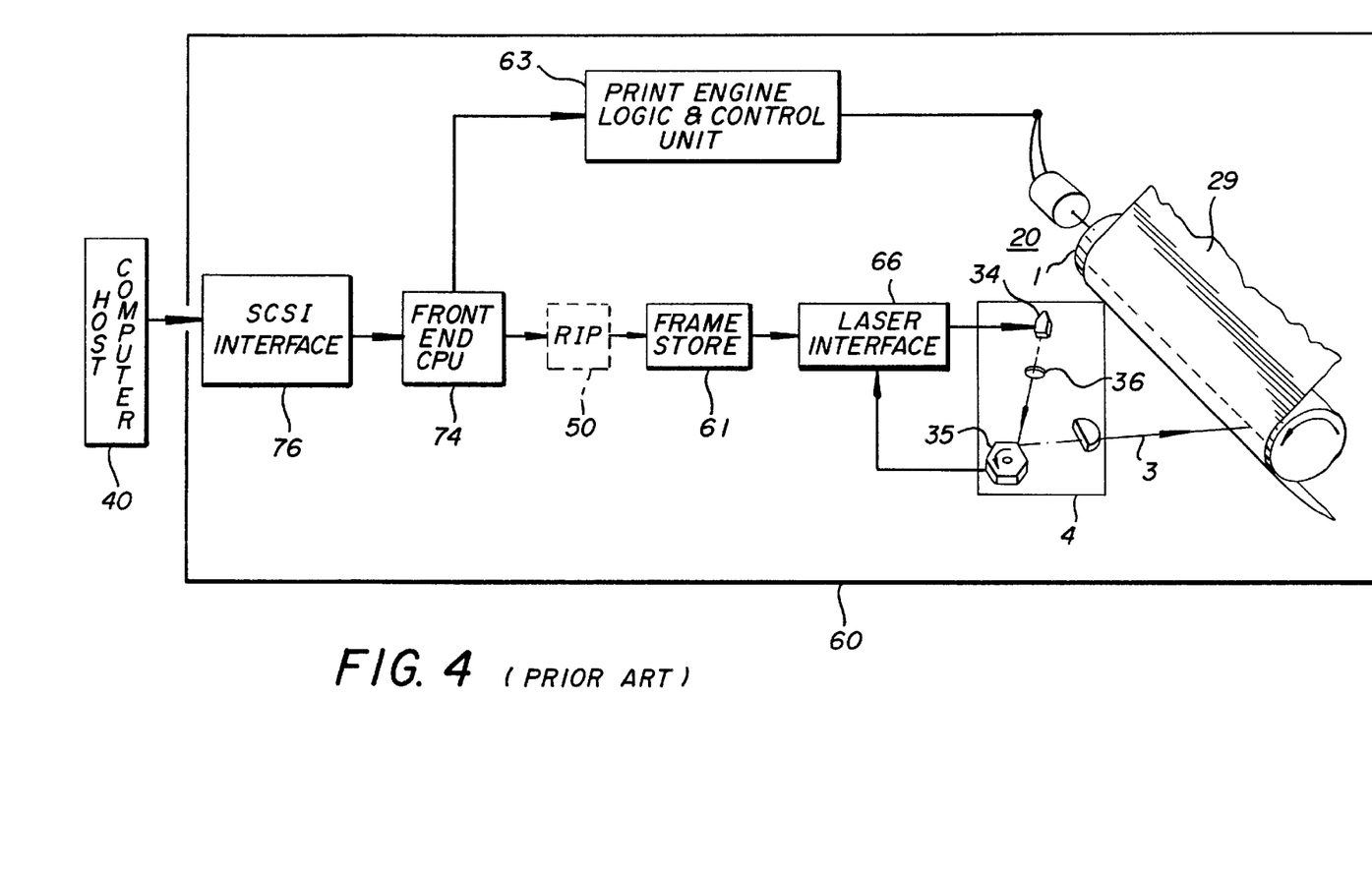
FIG. 4 illustrates schematically the details of the laser exposure portion of the print engine illustrated in FIG. 3.

FIG. 4 illustrates the details of a laser exposure portion of a typical print engine. It includes the normal datapath electronics that drive the laser subsystem. SCSI interface 76 communicates to the front end CPU 74 which separates the image data from command data and sends the image data to the image pipeline which includes RIP 50, frame-store 61, laser interface 66 and laser scanner 4. Once again, it should be noted that RIP 50 could be incorporated into the host computer 40 or between host computer 40 and print engine 60. The Sun Microsystem NEWS-PRINT system is based on this type of architecture. Alternatively, RIP 50 could reside in the print engine as shown in FIG. 4. The Hewlett-Packard LASER-JET series printer and the Apple LASERWRITER printer follow the second arrangement where the RIP is placed on board the printer. In either architecture, the basic elements and the way that the RIP functions is as explained earlier in conjunction with FIG. 2. Referring now to FIG. 4, the commands separated by the front end CPU 74 are either for print engine control or for datapath control. In the former case, they are redirected to the LCU 63. In the latter case, the commands are executed by the CPU 74 and/or RIP 50.

Frame-store 61 stores the bit-mapped information for each color separation of each image. U.S. Pat. No. 5,175,628 shows how the frame-store can be used to store and retrieve image color separation in different sequences to allow for printing of multiple images on a single sheet of a receiver. Depending on how many images are put on a single sheet, the final print is referred to 9-up, 4-up, etc.

The laser interface 66 synchronizes the retrieval of image data from the frame-store 61 to the exposure of data by the laser scanner 4. Each facet of the polygon 35 are detected by laser interface 66 and accordingly, one raster line of data is retrieved from the frame-store 61. Image data is corrected through a look-up table for proper tone reproduction and is sent to the laser diode 34 pixel by pixel. The optics of laser sub-system 36 will focus the laser beam 3 onto the photoconductor 29 on drum 1. Laser interface 66 counts the total number of pixels, as they are exposed, until the entire raster line is exposed. It also counts the number of raster lines as they are exposed until the entire image separation is exposed. The same is done for the color image separations. Once the 3 or 4 separations are exposed, the process is repeated with new bit-mapped image data in frame-store 61 for the printed page 2.

Depending on the architectural design of the printing system, some elements of FIGS. 2 and 4 could be combined and/or expanded. SCSI interface 76 could be combined with input unit 51. The same is true for front end CPU 74 and interpretation unit 55; frame-store 61 and frame memory 56 and page buffer 53.

It should be noted that the frame-store 61 is a key element and usually the most expensive. All electrophotographic printers require a full size frame-store for the page that they print. The reason is that once they begin to expose the photoconductor 29, they cannot be stopped. Therefore, a full page of raster data must be present inside the frame-store 61 before printing begins.

There are several problems associated with saving the bitmap page at full resolution as practiced in the prior art. One is that it forces the RIP to process an increased data load to generate every single pixel of the high resolution bit-mapped page. Also, the page memory needs to be of significant size if the pages are large (11×17) and a high resolution printer is used (500 dpi and higher). The other possible problem is the slow transfer of the bit-mapped image to the printer. In some cases, a bit-mapped image is generated by the RIP in the computer and then is sent to the printer through serial, parallel, or network ports. The larger the image, the longer it takes to transfer the bit-mapped image for that page.

Generally, the quality of the overall printing is raised so as to correspond to what is needed for the graphic designs that are to be printed. However, in the case where a high-resolution character pattern is provided for printing with graphic designs, a large-capacity storage is required for storing the character pattern. Or in a case where the character pattern is generated internally, a large amount of time is required to produce a character pattern from stored character information because of the high resolution of the character pattern which results in a lowering of the throughput that cannot be avoided.

Further, a large-capacity RAM is required to provide the frame-store because the entire area of the print image consists of a high-resolution image, which increases the cost of the system.

As mentioned earlier, doubling the resolution results in quadrupling the work the RIP is required to perform. Presently, powerful RIPs, like the one on the Apple LASER-WRITER or SUN laser printer take up to several minutes on pages containing both graphics and text. The resolution of these printers is on the order of 300 dpi. The RIP time will only increase when color is required or if image in its place are included with the documents. One can image how much time the RIPs would need to rasterize complex graphic design and text pages at 500 dpi.

Figure 5:
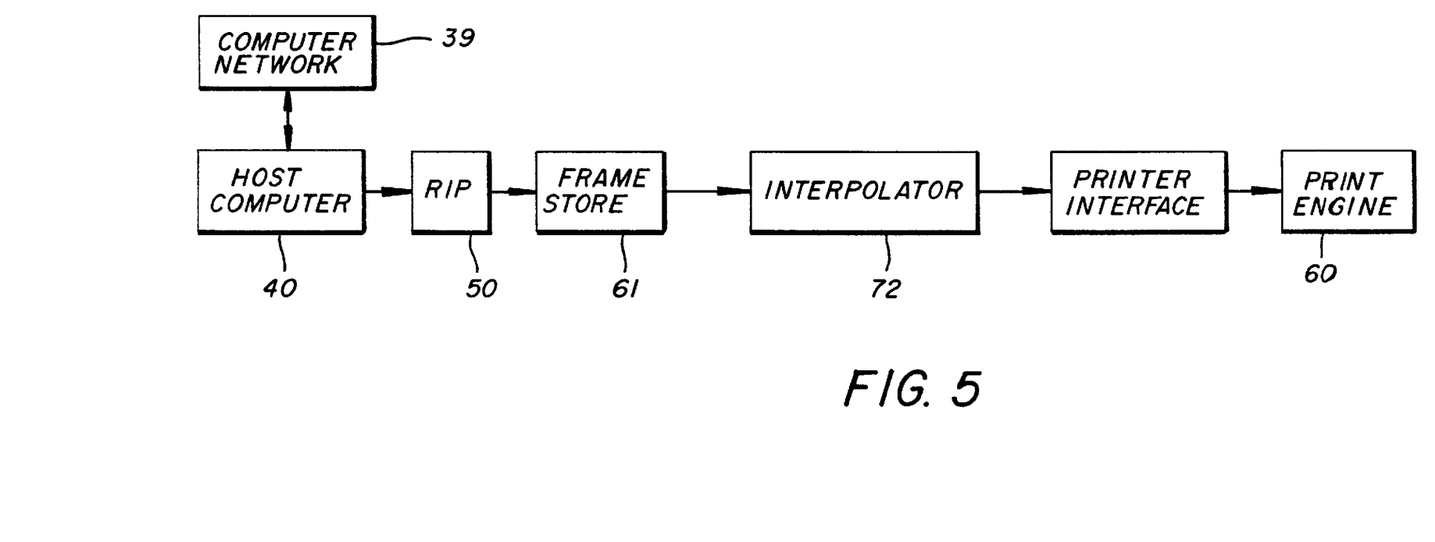
FIG. 5 illustrates a block diagram of the present invention.

FIG. 5 shows the elements of the preferred printing system that eliminates the problems described above. The addition of interpolator 72 between the frame-store and printer interface, allows for having different resolution print data streams before and after the interpolator. Following the teachings of the present invention, only low resolution print data stream is handled in all the print system elements of FIG. 5 that are to the left of the interpolator. As explained earlier, storing low resolution print data in frame-store 61 translates into the use of a smaller frame-store. It also means shorter time periods to transmit print data from RIP 50 to frame-store 61. The RIP 50 will also perform considerably fewer computations while generating the bit-mapped print data at a lower resolution. Interpolator 72 will increase the print data stream resolution to the resolution of print engine 60. The elements in the printing system to the right of the interpolator will function at the higher resolution of the print engine as explained earlier in FIG. 1.

Figure 6:
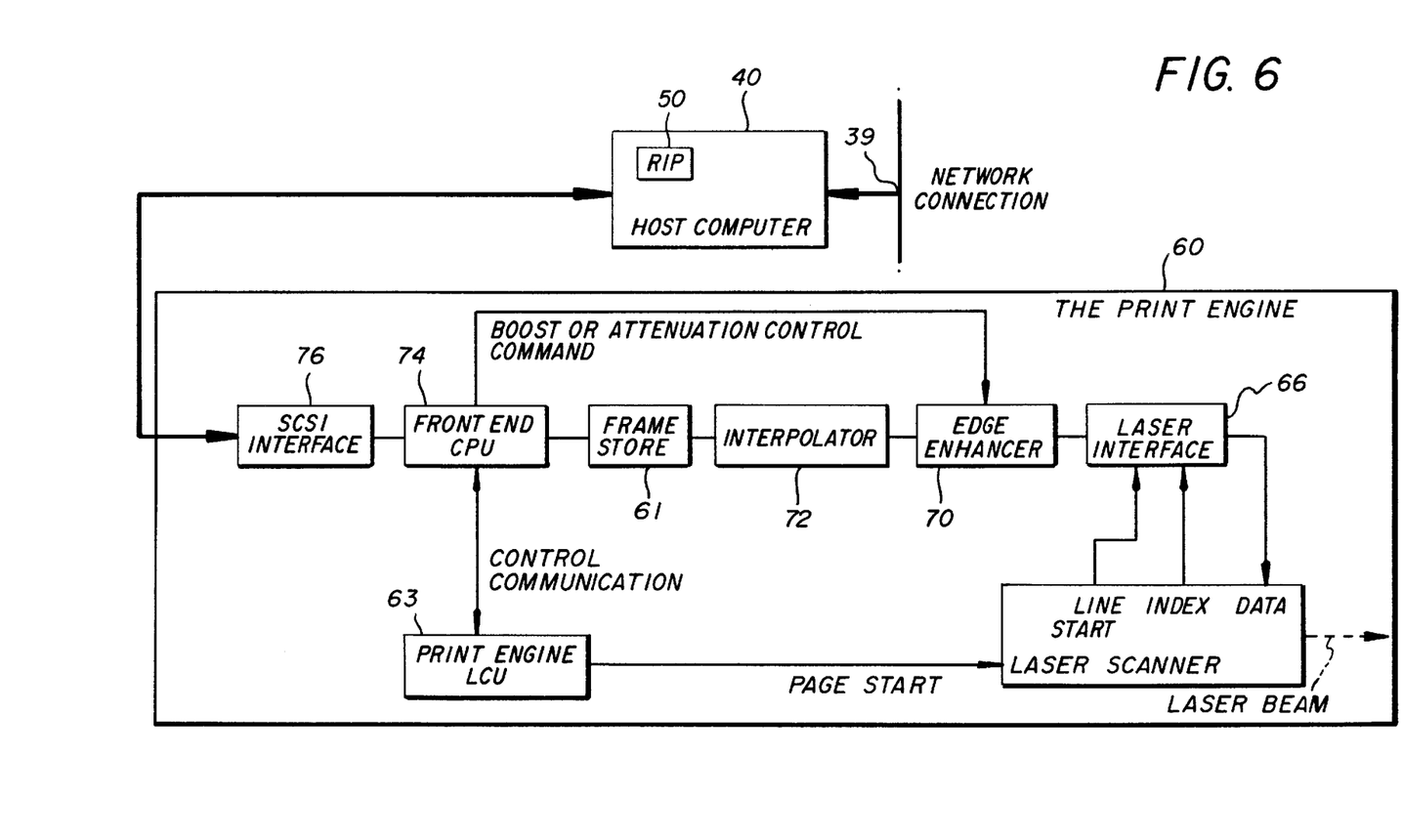
FIG. 6 illustrates a block diagram of a preferred embodiment of the present invention.

FIG. 6 shows the data path for handling the images in the preferred system. Files created with the page description language (PDL) are sent to the host computer 40 through a connection to a computer network 39 alternatively they could have been generated by host computer 40. Here, RIP 50 is shown located in the host computer 40, but as mentioned earlier, could also be located within the printer. The image data from the host computer 40 is routed through RIP 50 directly to the SCSI interface 76 in the print engine. The SCSI interface 76 provides the proper connection to the CPU 74 which is the electronic front end and distinguishes image data from command information. The image information is directed to frame-store 61 for temporary storage, while the command information is sent to the print engine LCU 63 or handled by CPU 74. Image data is stored in frame-store 61 until a proper print format is established (i.e., 4-up, 9-up, etc.). Raster lines of the print are read out of frame-store 61 line-by-line and sent to the interpolator 72. Interpolator 72 will increase the resolution of the image data so that the proper image size could be reproduced, for example, 9-up is printed on "12×18" paper for nine 4"×6" prints. The interpolated raster lines are then directed to the edge enhancer 70. The amount of boost or sharpening applied by edge enhancer 70 is controlled by CPU 74 via the boost control command line. The amount of boost is based on information received by CPU 74 as to the type of film being scanned by the input scanner and that information is sent as command information by the host computer 40. Film type has a direct effect on the amount of enhancement because it is based on the amount of grain in the film. The amount of enhancement is also varied if the page contains only graphic designs and characters. Enhanced raster lines are buffered and synchronized through the laser interface 66 to the laser scanner 4. Laser beam 3 is then used to expose photoconductor 29 to form a latent image.

Often, it is the plan to use the computing power of the host computer 40 for rasterizing the pages. Plans were made to use what is referred to as a software RIP. A separate dedicated card that can do the RIP work is also optional (hardware RIP). The key to the plan is to instruct the RIP to generate the bitmap page for a low resolution printer, i.e., 250 dpi or 200 dpi. This small and low resolution page is transferred quickly to the frame-store. The interpolator is instructed to operate at the correct ratio, say, 2 or 2.5, respectively, and the image is printed at a full 500 dpi.

Simulations have shown that interpolation ratios can be as high as 6 for images before noticeable image degradation is visible. For text and graphs, the same type simulation was just undertaken. The initial estimate is that the interpolation ratio could be as high as 3 for text and line art. It is clear that RIP time could be reduced by a factor of 9 (the square of 3) with this concept without significant image quality degradation.

Based on the same discussion as above, the size of the frame-store could be reduced by a factor of 9. This is because the size of the bitmap page is reduced by the square of the interpolation ratio. Another significant factor is the reduction in time to transfer the bitmap page from RIP to frame-store over the SCSI channel. Again, this time could be reduced by a factor of 9.

Because the interpolator runs at a ratio higher than 1 (typically between 2 and 4), the frame-store data rate during exposure is reduced by the square ratio of interpolation. For example, if the interpolation ratio is at 3, then the data rate of the frame-store will be 1/9 of the full resolution case which is the maximum bandwidth of the frame-store. Therefore, we have 8/9 of the bandwidth available for loading the next image into the frame-store. Thus, we could be processing the next page while printing the present one simultaneously.

Generally, it should be noted that a software RIP can work at any resolution with a mere input command from the host computer, but on the other hand, most traditional hardware RIPs have only one working resolution and cannot readily be changed to a different resolution.

Figure 7:
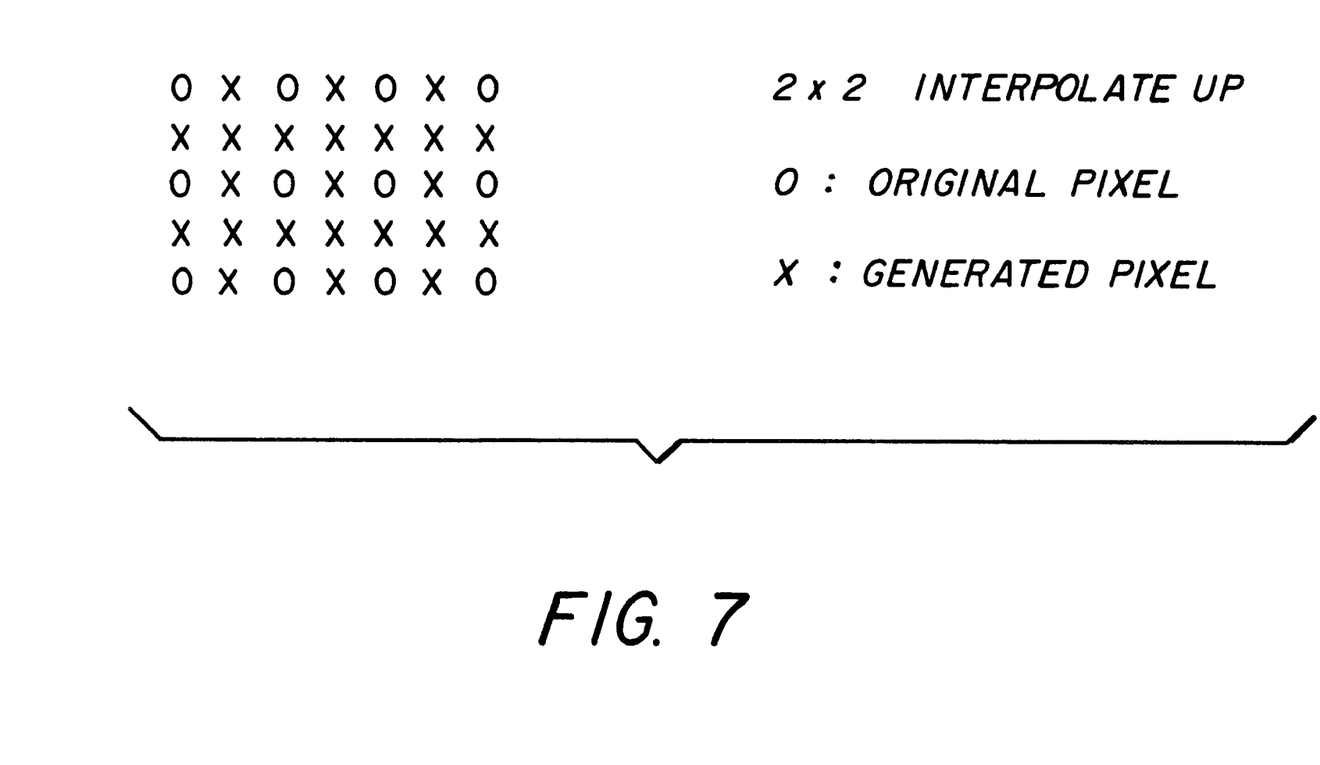
FIG. 7 shows an example of a 2x interpolation with "0" representing the original low resolution data points and "x" are the calculated pixels of the new higher resolution image.

The interpolator converts the resolution of the stored image in the frame-store to the printer resolution. The printer resolution is fixed at 500 dpi. The stored image resolution can be any number since the interpolator can interpolate at any ratio (for example, 1.953 or 2.000). FIG. 7 shows an example of a 2x interpolation. The point shown with "0" are the original low resolution data points of the image. The points marked "x" are the calculated pixels of the new higher resolution image. Notice how the number of data points has increased considerably by a simple 2x interpolation (interpolation ratio is equal to 2.000).

Interpolation

Figure 9:
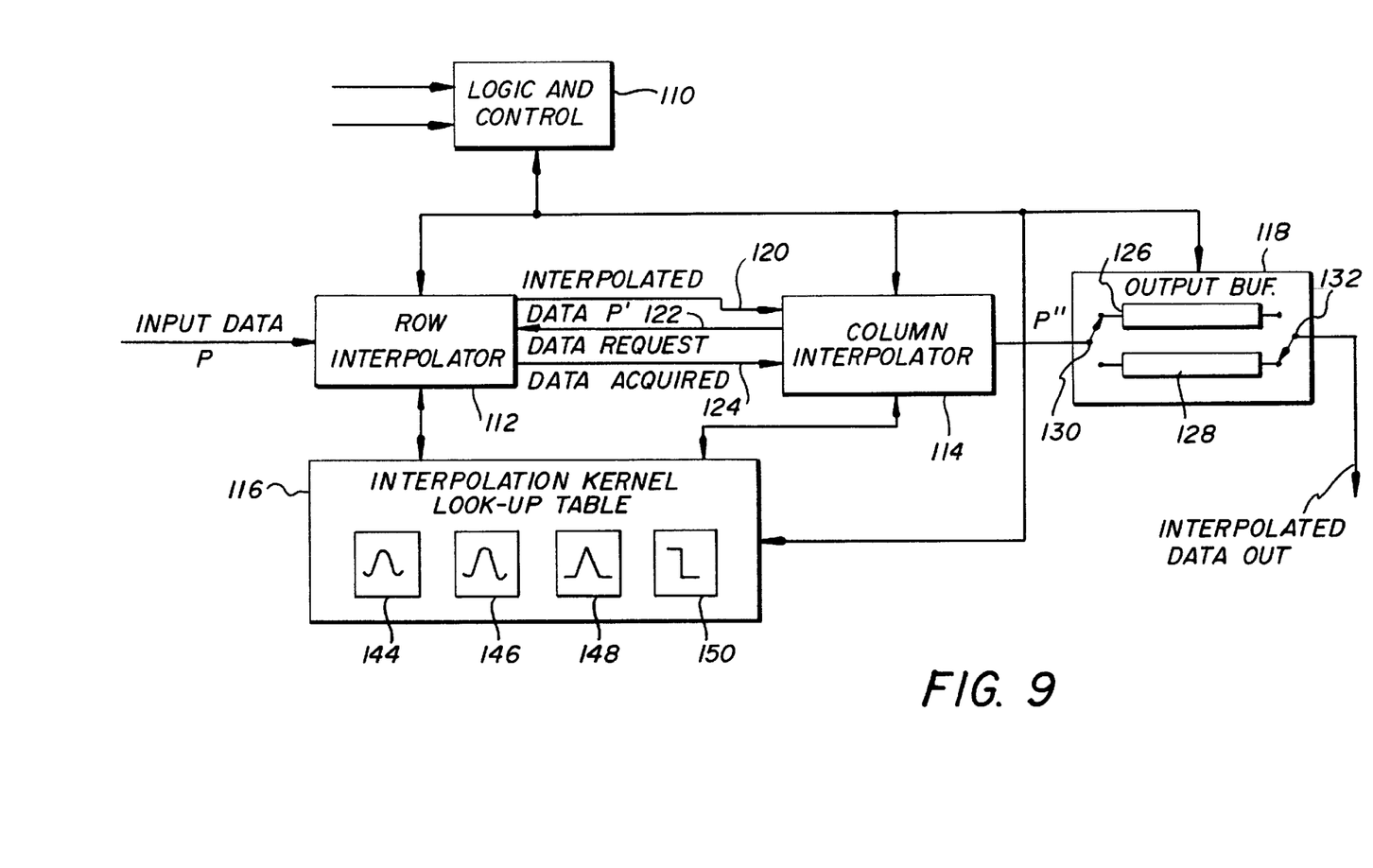
FIG. 9 is a block diagram of an interpolator that can be used with the present invention.

FIG. 9 is a schematic block diagram showing an interpolator according to the present invention. The interpolator receives digital image pixel data, for example, from a frame-store memory (not shown) one row at a time and produces interpolated digital image data one row at a time which can be supplied to a printer (not shown) or stored for future use, for example, in a frame-store. The interpolator includes a logic and control circuit 110 which calculates a horizontal sampling increment $h_H$ and a vertical sampling increment $h_V$ for the output images and controls the overall operation of the interpolator. The sampling increment h is determined by magnification factors that can represent expansion, reduction, or no change in the number of pixels in the image in the horizontal and vertical directions. The interpolator includes a row interpolator 112, a column interpolator 114, an interpolation kernel look-up table 116 and an output buffer 118. In operation, the logic and control unit 110 receives instructions regarding the number and size of input images to be printed on a particular output format, and calculates magnification factors to be applied to each image, based on the number of pixels in the original image, and the number of pixels to be provided in the interpolated output image. The row interpolator 112 retrieves pixel values along a row and interpolates pixel values P' between them by retrieving interpolation coefficients from the one-dimensional interpolation kernel look-up table 116. The row interpolator multiplies the pixel values by their respective interpolation coefficients and sums the product to produce the interpolated values. The interpolated pixel values P' from the row interpolator are supplied upon request to the column interpolator 114 on line 120. The column interpolator 114 requests data on line 122 and when the row interpolator 112 supplies the data, an acknowledgment is supplied on line 124.

The column interpolator 114 acquires and stores several rows of interpolated pixel data until it can start performing interpolation in a column direction on the stored data. When sufficient data has been acquired, the column interpolator 114 begins interpolating in a column direction to produce rows of interpolated values P" between the rows supplied by the row interpolator 112.

The column interpolator 114 interpolates in a column direction by selecting a plurality of pixel values arranged in a column from the acquired rows, retrieving a corresponding plurality of interpolation coefficients from the look-up table 116 and performing multiplication and addition of the products in a manner similar to the row interpolator 112. The coefficients are derived from different interpolation kernels, for example, cubic convolution interpolation kernel 144 and 146 or the linear interpolation kernel 148 or replication kernel 150, depending on image content. The column interpolator 114 provides rows of interpolated pixel values P" to the output buffer 118, which is double buffered so that a row of interpolated pixel values can be read out while the next row is being read into the output buffer 118. Double buffering is produced as is known in the art by a pair of buffers 126 and 128 and multiplex switches 130 and 132.

One-dimensional interpolation by use of the coefficients stored in look-up table 116 will now be described. Interpolation can be described as:

$$P'(x) = \sum_{k=-1}^{2} P_k \cdot C\left(\frac{x - x_k}{h}\right) \quad (1)$$

where P'(x) represents the interpolated value, $$C\left(\frac{x - x_k}{h}\right)$$

is a value of the interpolation kernel at location $(x-x_k)$; h is the sample increment of the interpolated function, $x_k$ represents the location of the samples of input data (also called interpolation nodes) and $P_k$ are the values of the input data at the interpolation nodes.

Figure 10:
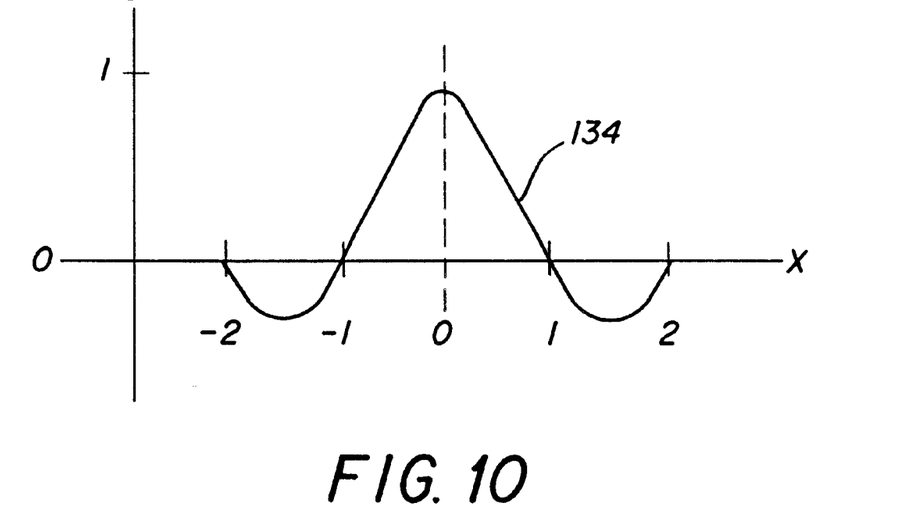
FIG. 10 is a graph showing a cubic convolution interpolation kernel.

The interpolation kernel is a continuous function that converts sampled data into a continuous function, the resulting continuous function can then be re-sampled to obtain the interpolated sample values. Cubic convolution employs a kernel that is defined by piecewise cubic polynomials defined on the subintervals (−2, −1), (−1,0), (0,1) and (1,2). Outside the interval (−2,2) the kernel is zero. Evaluation of equation 1 for the cubic convolution interpolation kernel requires four consecutive data samples from the original image data. FIG. 10 is a graph showing the cubic convolution interpolation kernel 134 defined on the interval (−2,2). The scale of the X axis in FIG. 10 is equivalent to the spacing of the data samples in the original image.

Figure 8:
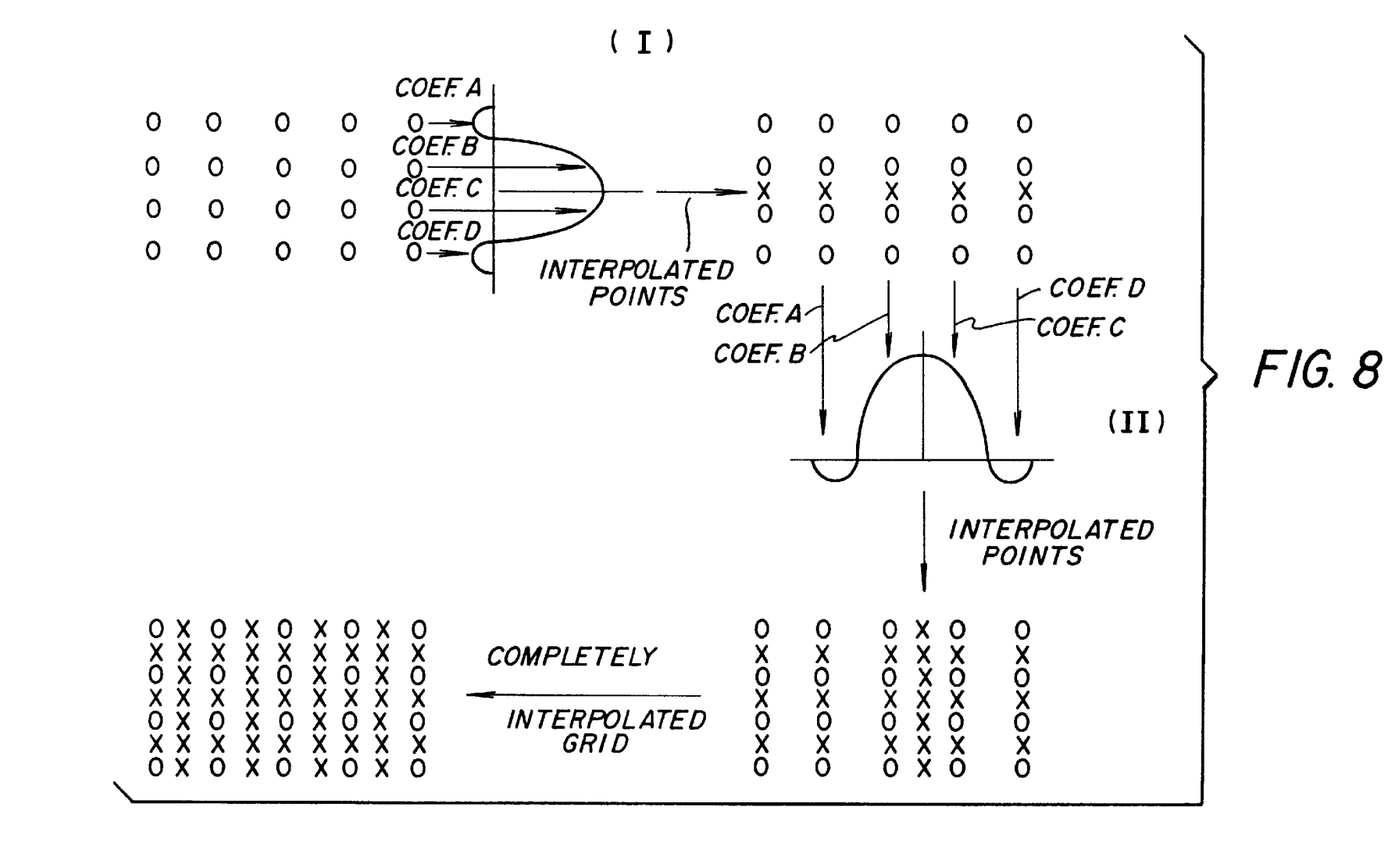
FIG. 8 illustrates graphically how a cascaded two-stage cubic convolution interpolation kernel is used to interpolate both vertically and horizontally.

Vertical interpolation is done at stage I and horizontal interpolation at stage II of FIG. 8. The center point of cubic convolution interpolation kernel is positioned over the original pixels (0's) where the newly-generated pixels (X's) are to be located. Then corresponding values of the cubic convolution interpolation kernel are read where the original pixels (0's) line up with the curve. These are named coefficients $C_A$, $C_B$, $C_C$, $C_D$. The image value of original pixel points (0's) are named A, B, C, D. The pixel values are usually 8 bits (0–255 values). The coefficients can be calculated to any accuracy as needed, but usually limited to 10–12 bits. The value of newly generated pixel (the X) is computed from the equation (2).

In stage I, the cubic convolution interpolation kernel is moved horizontally over the original pixels (0's) until all the necessary new pixels (X's) of a line are generated. Then, the cubic convolution interpolation kernel is moved vertically by h amount. As shown in FIG. 8, "h" is the sampling interval and explained by equation (4) of the Kerr patent discussed later. Now another row of new pixels (X's) are generated by repeating the steps explained above and using equation (2).

Stage II of interpolation, i.e., horizontal, is done in the lower part of FIG. 8. The steps for vertical interpolation are repeated similarly. One difference is that the cubic convolution interpolation kernel is moved over original pixels vertically first to create a new column and then stepped horizontally by step h.

Figure 11:
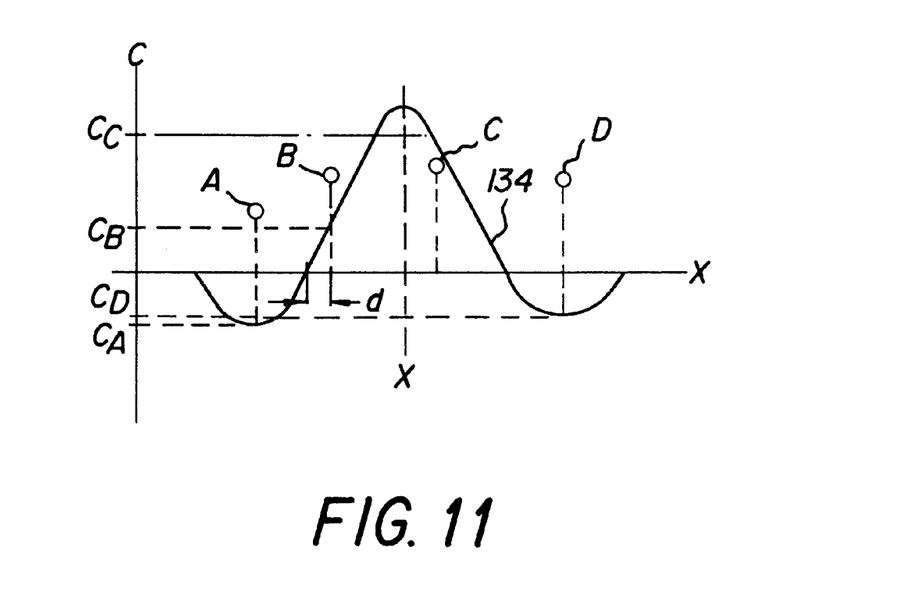
FIG. 11 is a graph useful in describing the method of interpolation by cubic convolution.

FIG. 11 illustrates how the cubic convolution interpolation kernel 134 is employed to compute an interpolated value at location x. Four consecutive data values from the original image data are shown as A, B, C and D. To produce an interpolated value at location x, the interpolation kernel 134 is centered at x, and the values of the kernel are calculated at the locations of the original data samples. These values $C_A$, $C_B$, $C_C$ and $C_D$ are the interpolation coefficients. The interpolated value at x is:

$$P(x)=(A \cdot C_A)+(B \cdot C_B)+(C \cdot C_C)+(D \cdot C_D) \qquad (2)$$

Figure 12:
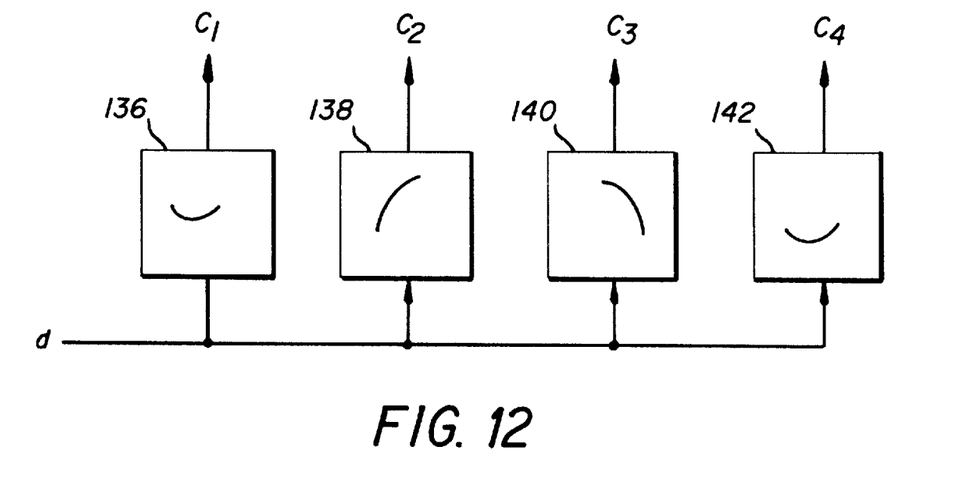
FIG. 12 is a schematic block diagram showing the arrangement of the interpolation coefficient memory.

A value at any location between original sample points B and C can be computed in this manner. To avoid the necessity of calculating the values of the interpolation coefficients each time an interpolated value is produced, the coefficient values are calculated from the piecewise cubic polynomials defining the kernel, and stored in the lookup table 116 (see FIG. 9). In a preferred mode of practicing the invention, the kernel is evaluated at 1,024 points to 16-bit accuracy. The resulting 1,024 coefficients are divided into four groups, representing the four segments of the kernel between (−2, −1), (−1,0), (0,1) and (1,2) each group having 256 coefficients. The four groups are stored in look-up table 116 which can be simultaneously addressed by a displacement value d that represents the distance from the zero in the kernel −1 to the sample B. The arrangement of the interpolation kernel lookup tables is shown in FIG. 12 where the first memory bank 136 contains the 256 coefficients that define the kernel on the interval (−2,−1). Similarly, the second memory bank 138 contains the groups of coefficients representing the portion of the convolution kernel from (−1,0), and so on for memory banks 140 and 142. As shown in FIG. 12, a displacement value d is simultaneously applied to all four memory banks to produce coefficients $C_1$, $C_2$, $C_3$ and $C_4$. Returning now to FIG. 9, the interpolation kernel lookup table may contain kernels for any number of other types of interpolation such as linear and replication, in addition to different types of cubic convolution. The lookup table 116 contains two cubic convolution interpolation kernels, one with a =−1 (144) and one with a =−0.5 (146), where a is a constraint applied to the interpolation kernel polynomials when the kernel is defined as follows:

$$C(s) = \begin{cases} (a+2)|s|^3 - (a+3)|s|^2 + 1 & 0 \le |s| \le 1 \\ a|s|^3 - 5a|s|^2 + 8a|s| - 4a & 1 < |s| < 2 \\ 0 & 2 \le |s| \end{cases} \qquad (3)$$

Figure 13:
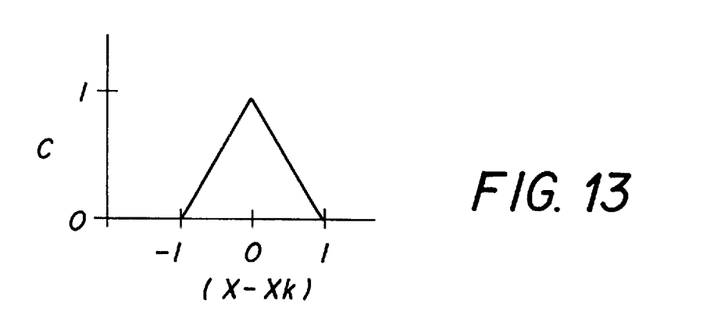
FIG. 13 is a graph illustrating a linear interpolation kernel.
Figure 14:
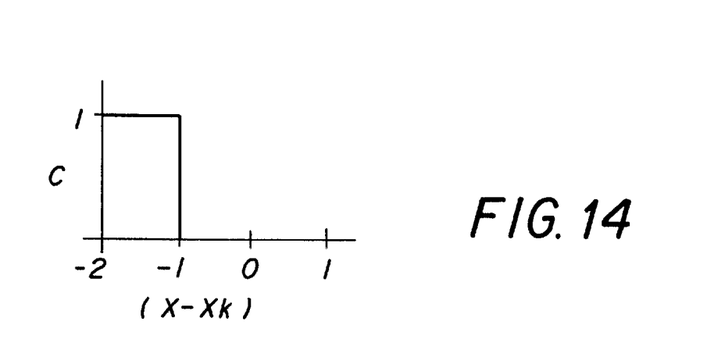
FIG. 14 is a graph illustrating replication interpolation kernel.

The interpolation lookup table also contains a kernel for linear interpolation 148 and a kernel for replication 150. The kernel for linear interpolation is shown in FIG. 13 and is graphically represented as a triangular waveform in the interval (−1,1) and zero elsewhere. The kernel for replication is shown in FIG. 14 and is graphically represented as a step function having a value of one in the interval (−2, −1) and zero elsewhere. Returning to FIG. 9, the logic and control circuit 110 selects the lookup table addressed by the interpolators 112 and 114 in response to an operator input specifying the interpolation procedure that is desired. For example, it is known that replication interpolation performs better on binary images such as text, thus the nearest neighbor kernel may be selected for performing interpolation on text portions of an image.

The sampling increment h is determined by the logic and control unit 110 by first determining a magnification factor M defined as the lesser of the two ratios x'/x, y'/y, where x is the number of pixels in the original image in the horizontal direction, and x is the number of pixels available on the output printer for printing the original image. The number of available pixels on the output medium is determined by the output format including the width of the output medium and the number of input images to be printed across the page in the output image. Similarly, y represents the number of pixels in an input image in the vertical direction and y' represents the number of pixels available to print the image in the vertical direction. The lesser of the two ratios is chosen so that the reproduced image will not be cropped. The sampling increment h is then determined by:

$$h = \frac{256}{M} \qquad (4)$$

where the 256 in the numerator comes from the fact that the interpolation kernel has been sampled 256 times between each interpolation node. The sampling increment h is computed to an accuracy of 24 bits.

In summary, interpolation is done by providing a digital image process for performing two-dimensional interpolation, having an interpolation coefficient memory containing interpolation coefficients representing a one-dimensional interpolation kernel. A row interpolator connected to the memory receives image pixel values along a row, retrieves interpolation coefficients from the memory and produces interpolated pixel values by interpolating in the row direction. A column interpolator connected to the memory and to the new interpolator receives rows of interpolated pixel values from the row interpolator, retrieves interpolation coefficients from the coefficient memory and produces rows of interpolated pixel values by interpolating in a column direction. In a preferred embodiment of the invention, the interpolation coefficient memory contains a plurality of interpolation kernels for performing different types of interpolation such as cubic convolution, linear and replication, and the interpolator includes a logic and control unit for selecting one of the interpolation kernels in response to an operator input. The interpolation coefficients are stored in a plurality of banks in the memory, and the banks are simultaneously addressed to return a plurality of coefficients, one coefficient from each bank. The row interpolator includes control means for replicating the first and last pixel in a row in an image so that interpolation values can be computed between the first and second pixels of an image row, and between the last and next to last pixels of a row. Similarly, the column interpolator includes control means for replicating the first and last columns of an image for interpolating between the first and second columns, and between the last and next to last columns of an image. U.S. Pat. No. 5,125,042, issued to R. Kerr et al contains detailed information about an interpolator that could be used in conjunction with the present disclosure.

Although various embodiments of the present invention have been shown and described herein, many other embodiments that incorporate the teachings of the present invention may be readily constructed by those skilled in the art.

I claim:

1. A document generation method for providing an output image having full printing resolution said method comprising the steps of:

(a) receiving a set of image data having coded instructions in a page description language;

(b) decoding said coded instructions in said image data at a first resolution;

(c) generating a first bit-mapped field of image data according to the coded instructions of the page description language for recording on a first image frame;

(d) storing the bit-mapped field in a frame-store;

(e) outputting the bit-mapped field of image data from the frame-store to an interpolator;

(f) interpolating the bit-mapped field of image data in real time to a second resolution higher than the first resolution;

(g) exposing a fist image frame of an image sensitive media with the interpolated bit-mapped field of image data;

(h) repeating steps (a) and (b) for a different set of image data to generate a second bit-mapped field of image data according to the coded instructions of the page description language for recording on a second image frame; and (i) inputting the second bit-mapped field of image data in said frame-store while performing steps (e), (f) and (g) on said first bit-mapped field of image data.

2. An apparatus for generating documents from print data containing coded instructions of a page description language, and for providing output print data, said apparatus comprising:

a raster image processor adapted to interpret coded instructions to produce a bit-mapped image representative of the transmitted image at a first resolution and to output the bit-mapped image to a frame-store memory;

a frame-store memory adapted to receive and store portions of two bit-mapped images and to output one of the two bit-mapped images to an interpolator while receiving a bit-mapped image data of a second of the two bit-mapped images;

an interpolator adapted to receive and change said bit-mapped image to a second resolution higher than said first resolution; and a printer for printing at said second resolution the interpolated bit-mapped image of said one of the two bit-mapped images on a first image frame and the said second of the two bit-mapped images on a second image frame.

3. An apparatus for generating documents as set forth in claim 2 wherein said first resolution is one-half said second resolution.

4. A document generation method comprising the steps of:

(a) receiving print data containing coded instructions of a page description language;

(b) interpreting said coded instructions to produce a first set of bit-mapped image data of an image to be printed on a first image frame and representative of the received print data at a first resolution;

(c) storing said produced bit-mapped image data in a frame memory;

(d) outputting bit-mapped image data from said frame memory to an interpolator;

(e) interpolating bit-mapped image data to a second resolution higher than said first resolution; and (f) printing the interpolated bit-mapped image data;

(g) interpreting coded instructions to produce a second set of bit-mapped image data in said first resolution of an image to be printed on a second image frame and (h) storing said second set of bit-mapped image data in said frame memory while outputting from said frame memory to said interpolator bit-mapped image data to be printed on said first image frame; and repeating steps (d), (e) and (f) for said second set of bit-mapped image data.

5. The method of claim 4 and wherein said step of interpolating includes receiving image pixels along a row;

retrieving interpolation coefficients from a coefficient memory;

producing first interpolated pixel values by interpolating in the row direction;

receiving rows of interpolated pixel values from the row interpolator;

retrieving interpolation coefficients from the coefficient memory; and producing a row of interpolated pixel values by interpolating in a column direction.

6. The method of claim 5 and wherein there is selectively retrieved from coefficient memory interpolation kernels for performing either cubic, linear or replication interpolation.

7. A document generation method set forth in claim 4 wherein said first resolution is one-half said second resolution.

* * * * *